March 29, 1955     J. Q. ST. CLAIR     2,705,194

DIAMOND TOOLS AND METHOD OF MAKING THE SAME

Filed Aug. 1, 1950     2 Sheets-Sheet 1

INVENTOR
JOHN QUINCY ST. CLAIR
BY Darby & Darby
ATTORNEYS

March 29, 1955  J. Q. ST. CLAIR  2,705,194

DIAMOND TOOLS AND METHOD OF MAKING THE SAME

Filed Aug. 1, 1950  2 Sheets-Sheet 2

INVENTOR
JOHN QUINCY ST. CLAIR
BY Darby & Darby
ATTORNEYS

United States Patent Office 2,705,194
Patented Mar. 29, 1955

2,705,194

DIAMOND TOOLS AND METHOD OF MAKING THE SAME

John Quincy St. Clair, Virginia, Minn.

Application August 1, 1950, Serial No. 176,935

8 Claims. (Cl. 51—293)

This invention relates to improvements in diamond tools, that is, tools having parts containing diamonds in the whole-stone or fragmented condition (hereinafter referred to as "diamond particles"), and also relates to improvements in the method of making diamond tools.

Customarily, in making such tools, the diamond particles are embedded in a material capable of being moulded or sintered, as, for example, powdered metal or synthetic resinous material. Diamond tools made with such materials, however, have been found to be brittle and to break easily when subjected to severe stresses and strains.

It has already been proposed in the case of a diamond saw to remedy this defect by constructing the saw as a whole out of a plurality of thin sheets (sheets of soft steel, copper, brass or other relatively flexible material being proposed in particular) and by having the diamond particles embedded on and between the surfaces of the sheets as a continuous ring around the periphery. The method proposed for making this saw, however, has been to coat the opposite surfaces of the sheets with a thermoplastic bonding material which is allowed to harden, and to apply the diamond particles to the dry coated surfaces and subject the sheets in stacked condition (while being cooled to a temperature below the softening point of the thermoplastic material) to a compressive force of an intensity sufficient to embed the diamond particles in the sheets, whereafter the compressed stack is subjected to pressure and to a temperature sufficient to soften the thermoplastic material to bond the sheets together, and is finally permitted to cool while under pressure.

In experiments which I have carried out on the making of diamond tools out of thin metal sheets, I have found that, when it is attempted to embed diamond particles in thin metal sheets, a considerable number of the particles become broken when the attempt is made (that is, when the compressive force is applied to the stack) with the metal sheets in their normal, cold and hard condition.

One of the objects of my invention is accordingly to provide a method of making diamond tools which will obviate this defect.

I have also found in my experiments that, in the compressing of the metal sheets in the cold, hard condition, there is a tendency for the diamond particles to shift their lateral position, with resulting diminution, in the finished tool, of the cutting efficiency.

A further object of my invention is therefore to eliminate this tendency and provide a method which will ensure that the diamond particles are embedded in the most efficient manner in the tool.

In achieving these objects, and generally in order to achieve an improved method of making diamond tools, I prefer not to make the diamond-bearing sheets as an integral portion of the body of the tool, but, for the sake of convenience and economy, and to ensure greater uniformity and efficiency throughout the diamond-bearing portion, to constitute the diamond-bearing sheets as a separate part or parts which, in order to constitute the tool, is or are inserted or embodied subsequently in a separate body or blank. My invention is not confined to this separate construction, however, and it is to be understood that in using herein the term "diamond tool," I include diamond-bearing parts whether integral with, or made separate from and insertible in, the body of a tool.

In accordance with my invention, I provide a method of making a diamond tool consisting of a stack of sheets with intervening diamond particles, compressed and united together, which comprises the step of heating the sheets to a temperature sufficient at least to soften the sheets and ease the embedding, through the compression of the stack, of the diamond particles in the sheets. By this step, crushing or breakage of the diamond particles is avoided or minimised.

According to a further feature of my invention, my said method preferably also includes the step, prior to the sheets being stacked, of affixing the diamond particles upon each of the sheets in predetermined relative position. By this step, conjointly with the softening as aforesaid of the sheets, displacement of diamond particles laterally on the sheets is avoided or minimised. As a result, by selective spacing or distribution of the diamond particles on each sheet, and by orientation of the sheets about their axes relatively to one another in the stack, so as to offset the particles on one sheet from direct location above and/or below the particles on the sheet or sheets adjacent, a substantially homogeneous cross-section is obtainable throughout the tool in respect of the density and form of distribution of the diamond particles.

According to a still further feature of my invention, my said method may comprise the step of subjecting the stack of sheets to a heat of such temperature and/or such a pressure as not only to soften the sheets but also to fuse or weld them together. By this step, the need for the application to, or incorporation with the sheets of a separate bonding material, such as, for example, a solder or synthetic resinous material which I otherwise employ for bonding of the sheets, is avoided or made dispensable.

In order that my invention may be fully understood, I shall now describe, by way of example, a number of methods, embodying the same, with reference to the accompanying drawings, in which:

as shown in Fig. 4) according to my invention.

Figure 1:
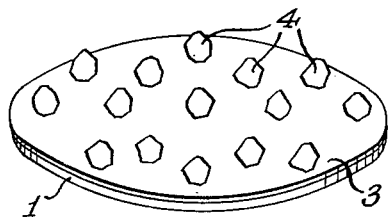
Fig. 1 is a view in perspective of a metal sheet with the diamond particles applied to one side thereof.

Referring to Figs. 1 to 4:

The sheets 1 and 2 are shown as of disc shape. They may, however, be of any other convenient shape according to the nature of the tool for which they are to be used, as, for example, in the form of segments of a ring to be fitted to the periphery of a cutting-wheel, or segments to be fitted to a diamond drill crown.

Each of the discs 1, 2 is of thin sheet metal such as, for example, bronze brass, mild steel, or iron, in thicknesses of from .005 inch to .25 inch or thereabout. The thicker metal is preferably used for the incorporation of whole-stone diamond material, where the average size of the diamond may be larger than fragmented diamond or bort.

Each disc 1, 2 is first coated with a low-melting alloy or solder 3, the disc 1 on one side and the disc 2 on both sides. The solder 3 may be either silver solder, lead solder, or other solder materials such as those known by the trade names "Easy-Flo," "Sil-Fos" or the like. While the solder 3 is still molten or plastic, the diamond particles 4 are placed on the coated surfaces in predetermined positions, and the particles are held by the solder in these positions.

Figure 3:
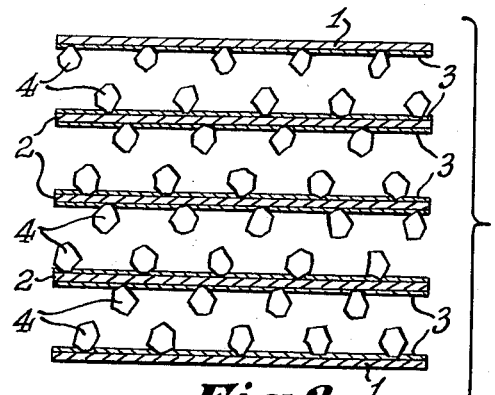
Fig. 3 is an exploded view in cross-section of a stack composed of discs as shown in Figs. 1 and 2.
Figure 2:
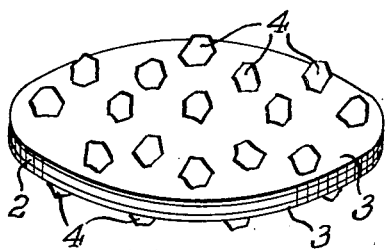
Fig. 2 is a similar view of a metal sheet with the diamond particles applied to both sides thereof.
Figure 4:
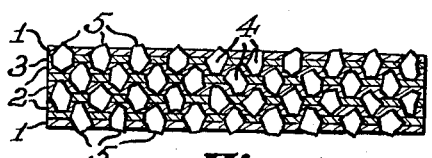
Fig. 4 is a view in cross-section of the stack (Fig. 3) compressed or consolidated to a diamond tool according to my invention.

The discs 1, 2 are then stacked in the manner illustrated in Fig. 3, that is, with three discs 2 coated on both sides in the middle of the stack, with diamond particles 4 on each side, and with discs 1 coated on one side at top and bottom, with diamond particles only at their inner side. In placing the diamond particles 4 on the sides of the discs 2, the particles on one side are offset from direct location above the diamond particles 4 on the other side. Moreover, in stacking the discs 1, 2, each disc is so orientated about its axis as to ensure that the diamond particles 4 on adjacent discs are offset from the particles above or below. By the predetermined placing of the diamond particles 4, therefore, it is possible to obtain an even distribution of the diamond material throughout the stack as a whole.

The discs 1, 2 are assembled or stacked as aforesaid in a mould or holder so that, in order to constitute the finished tool, they can be subjected to heat and pressure. The stack is heated (e. g. by an oxyacetylene or other flame or furnace, or electric-resistance heating) to a temperature sufficient not only to melt the solder 3 but also to soften the metal of the discs 1, 2. Thereafter, or simultaneously, pressure is applied (e. g. by a hydraulic or other ram) to the stack, so as to cause the diamond particles 4 to become evenly embedded in the discs 1, 2 and to penetrate through these discs. Thus, in the case of the top and bottom discs 1, the diamond particles 4 on the inner surface penetrate through these discs and project from the outer surfaces of the disc as at 5 an extent sufficient to impart the requisite gauge to the tool at the sides, e. g. as in the case of a cutting-wheel, to prevent the wheel jamming in the kerf. While still under pressure, the discs 1, 2 are allowed to cool, and the solder 3, as it hardens, bonds the discs together to constitute the finished tool. As will be appreciated, the number of discs 1, 2 stacked and compressed together is made sufficient to give the thickness of tool required.

Figure 5:
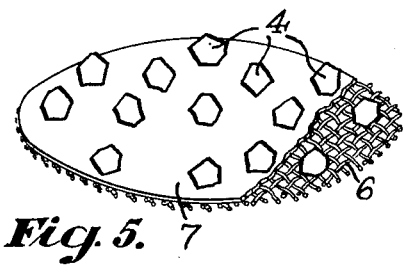
Fig. 5 is a view in perspective of a sheet composed of fine wire gauge with diamond particles affixed thereto.
Figure 7:
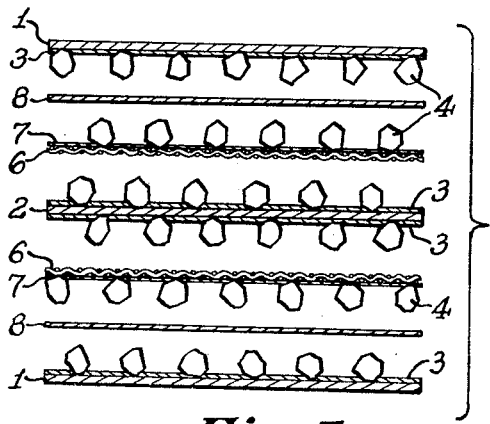
Fig. 7 is an exploded view in cross-section of a stack composed of sheets as shown in Figs. 1, 2, 5 and 6.
Figure 6:
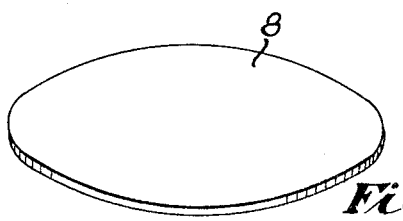
Fig. 6 is a view in perspective of a sheet or foil of solder.

Referring to Figs. 5, 6 and 7:

These figures illustrate another method of forming the stack and consolidating the same. The disc 6 shown in Fig. 5 is made, to a thickness similar to that of the discs 1, 2 aforesaid, of fine wire gauze. This gauze is coated with an oil or adhesive material 7 and diamond particles 4 are placed in predetermined positions on the upper surface of the gauze while the oil or adhesive is still wet. The disc 8 shown in Fig. 6 is made of a similar thickness out of foil made of solder as aforesaid. Preferably, the oil or adhesive material 7 has mixed therein, or is otherwise adapted to serve also, as a flux for the solder. The stack prepared for heating and compression, as shown in Fig. 7, consists of upper and lower discs 1 with diamond particles 4 affixed to their inner surfaces by solder 3 as already described with reference to Figs. 1 and 3, together with a middle disc 2 with diamond particles 4 affixed to both of its surfaces by solder as described with reference to Figs. 2 and 3, and two of the gauze discs 6 interposed between the discs 1 and the disc 2, with a solder foil 8 between each gauze disc 6 and the adjacent outer disc 1. As in the case of the method already described, the discs 1, 2 and 6 are softened by the heat applied to the stack, and the solder 3 and foil 8 rendered molten, so that, under compression, the diamond particles 4 become embedded in and penetrate through the discs 1, 2 and 6 and the solder bonds the whole into a united tool which is allowed to cool. As will be appreciated the interstices of the gauze permit the solder to penetrate more thoroughly for bonding purposes throughout the stack.

Figure 9:
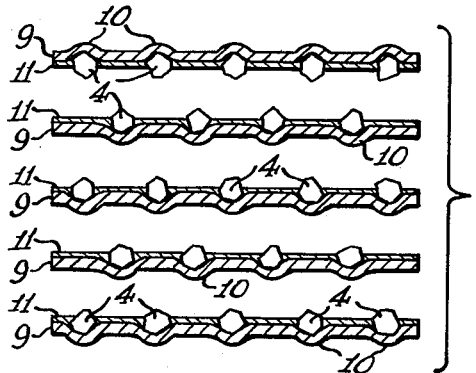
Fig. 9 is an exploded view in cross-section of a stack composed of sheets as shown in Fig. 8.
Figure 8:
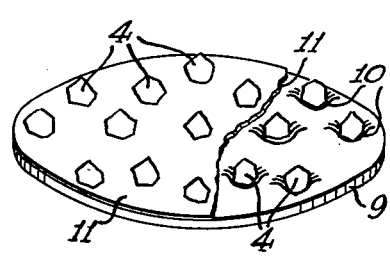
Fig. 8 is a view in perspective of an indented sheet with diamond particles affixed in the indentations.
Figure 10:
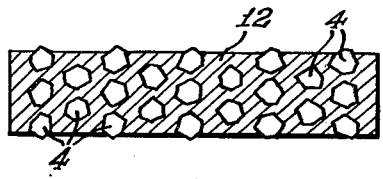
Fig. 10 is a view in cross-section of the stack (Fig. 9) when consolidated.

Referring to Figs. 8, 9 and 10:

These figures illustrate a further method of constituting and consolidating the stack. The disc 9 shown in Fig. 8 is made of similar thickness and material to the discs 1 or 2 already described. Indentations 10 are made in the disc 9 in the predetermined positions in which the diamond particles 4 are to be placed. The disc 9 is coated on its indented surface with an oil or adhesive 11, and the diamond particles 4 are placed in the indentations 10 while the oil or adhesive is still wet. As shown in Fig. 9, the requisite number of discs 9 (five in the case illustrated) are stacked together, with the uppermost disc preferably inverted. The discs, as in the other cases described, are orientated so as to obtain uniform distribution of the diamond particles 4. The consolidation of the stack is, in this method, effected without the addition of solder or bonding material. For this purpose, the stack is subjected not only to a temperature sufficient to soften, and ease penetration of the diamond particles 4 into the discs 9, but to a temperature which will result in the discs 9 being fused or welded together. Thus, the temperature applied to the stack when compressed may be sufficient to effect the melting of the discs 9 so that they are brought to a solid mass 12 (Fig. 10) by fusion. Alternatively, the stack may be heated to a temperature just below the melting point of the discs 9, so that, under the compression, they are brought to a solid mass 12 (Fig. 10) by welding.

Figure 11:
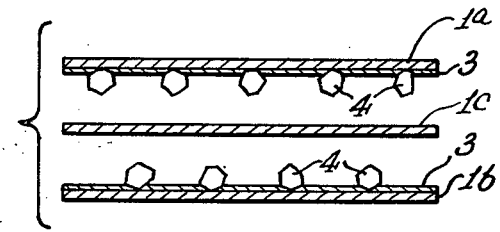
Fig. 11 is an exploded view in cross-section of a stack composed of two sheets as shown in Fig. 1 with a sheet of the same metal (without diamond particles) placed between them.

Referring to Fig. 11:

This figure illustrates a modification of the stack described with reference to Figs. 1 to 4. It includes top and bottom discs $1^a$, $1^b$, which are similar to the disc 1 (Fig. 1) in that each is coated on its inner face with solder 3, with diamond particles 4 affixed thereto in predetermined positions. Between the discs $1^a$, $1^b$, there is a third disc $1^c$, which is made of the same metal as the discs $1^a$, $1^b$, but its faces are left plain, i. e. without solder or diamond particles. This stack is consolidated in the same manner as the stack described with reference to Figs. 3 and 4, that is, by heating the stack to a temperature sufficient to melt the solder 3 and soften the metal of the discs $1^a$, $1^b$ and $1^c$, and by applying pressure to the stack so as to bond the discs together and cause the diamond particles 4 to become evenly embedded in, and to penetrate through the discs.

Figure 12:
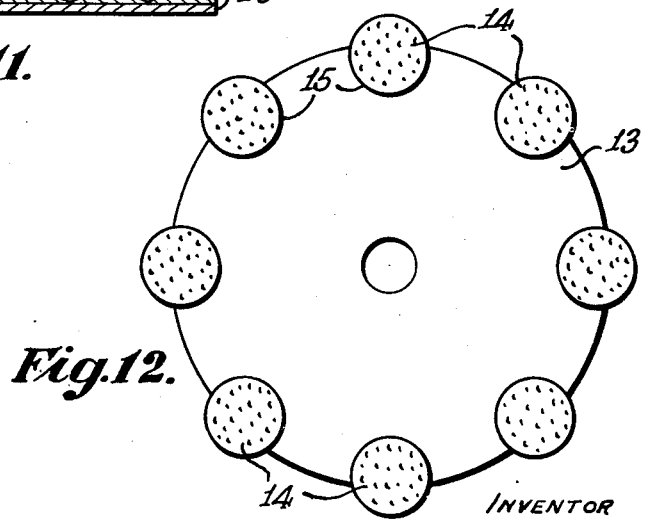
Fig. 12 is a view in side elevation of a cutting wheel equipped with diamond tools (e. g.

Referring to Fig. 12:

This figure illustrates, to a reduced scale, a cutting wheel 13 having diamond tool parts or inserts 14, made according to any of the methods described above. The inserts 14 are secured in recesses 15 (e. g. by brazing, soldering, welding or otherwise) provided in the body of the cutting wheel, and are adjustable when worn at the operative or exposed part, and removable for replacement by others when worn out.

Preferably, in each of the cases above-described the diamond particles are pre-conditioned by lavaging before being applied to the sheets, and are also classified according to size with a view to having the diamond particles of equal size, or substantially equal size, throughout each sheet or each stack of the sheets.

I claim:

1. A method of making a diamond tool consisting of a stack of metal sheets with intervening diamond particles, compressed and united together, comprising affixing diamond particles to each of a number of sheets of sheet-metal in a spaced distribution, affixing diamond particles to each of a number of sheets of fine wire gauze also in a spaced distribution, stacking the sheets with the sheets of sheet-metal and sheets of gauze interleaved and with the diamond particles in each sheet offset from the diamond particles in the sheets adjacent, heating the stack to a temperature sufficient to soften the sheets compressing said stack sufficiently to cause the diamond particles therein to penetrate said sheets and to bond the sheets together.

2. A method according to claim 1, in which bonding sheets of solder foil are interleaved in the stack.

3. A method of making a diamond tool consisting of a stack of metal sheets with intervening diamond particles, compressed and united together, comprising the steps of applying diamond particles in spaced distribution to the opposite sides of a number of inner sheets, applying diamond particles in spaced distribution to the inner side of a pair of outer sheets, applying solder to the sides of the said inner sheets and to the inner sides of the said outer sheets, stacking the said inner sheets between the inner faces of the said outer sheets with the diamond particles in each sheet offset from the diamond particles in the sheets adjacent, heating the stack to a temperature sufficient to soften the sheets as well as to melt the solder, and subjecting the heated stack to compression sufficient to cause the diamond particles to penetrate the sheets and bond the stack, with diamond particles projecting through the outer sheets.

4. A method of making a diamond saw blade consisting of a stack of metal sheets with intervening diamond particles, compressed and united together, comprising adhesively affixing diamond particles to each said sheet in a spaced distribution, stacking the sheets with the diamond particles in each sheet offset from the diamond particles in the sheets adjacent, heating the stack to a temperature sufficient to soften the sheets and compressing said stack to embed the diamond particles therein and cause the diamond particles to pierce said sheets and project therefrom as well as to bond the sheets together.

5. A method of making a diamond saw blade consisting of a stack of metal sheets with intervening diamond particles, compressed and united together, comprising the steps of applying a solder to the sheets, affixing to the surfaces of the sheets diamond particles distributed over these surfaces in spaced relationship, stacking the sheets with the diamond particles in each sheet offset from the diamond particles in the sheets adjacent, heating the stack to a temperature sufficient to melt the solder and soften the sheets, and compressing said stack to solder the sheets together and cause the diamond particles to pierce said sheets and project therefrom and embed the diamond particles therein.

6. A method according to claim 5, in which a material is applied to the sheets which serves both as an adhesive for the diamond particles and a flux for the solder.

7. A diamond saw blade consisting of a stack of metal sheets with intervening diamond particles, compressed and united together, with a sheet of lower melting point than said first mentioned sheets between each pair of first mentioned sheets and with said diamond particles piercing said sheets and projecting therefrom.

8. A diamond saw blade consisting of a stack of metal sheets, each sheet having solder applied thereto with intervening diamond particles bonded between each pair of sheets and the diamond particles piercing said sheets and projecting therefrom.

References Cited in the file of this patent

UNITED STATES PATENTS

| | | |
|---|---|---|
| 2,104,708 | Taylor | Jan. 4, 1938 |
| 2,141,202 | Wallace | Dec. 27, 1938 |
| 2,194,546 | Goddu et al. | Mar. 26, 1940 |
| 2,270,258 | Buchmann | Jan. 20, 1942 |
| 2,290,631 | Buchmann | July 21, 1942 |
| 2,361,492 | Pare | Oct. 31, 1944 |
| 2,418,529 | Stern | Apr. 8, 1947 |
| 2,545,676 | Small | Mar. 20, 1951 |
| 2,562,587 | Swearingen | July 31, 1951 |